No. 770,650. PATENTED SEPT. 20, 1904.
G. R. PENN.
GATE.
APPLICATION FILED APR. 9, 1904.
NO MODEL. 2 SHEETS—SHEET 2.
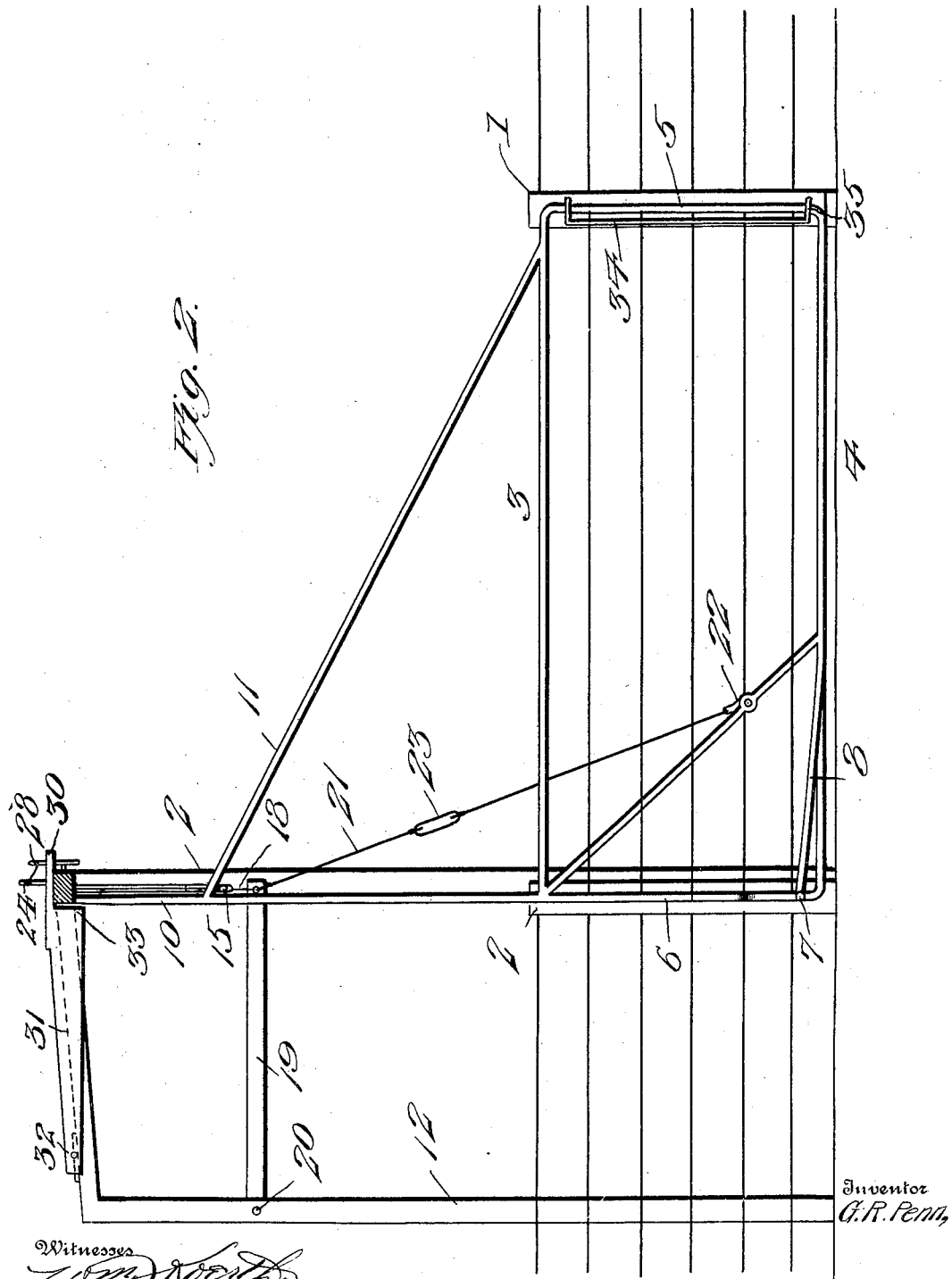

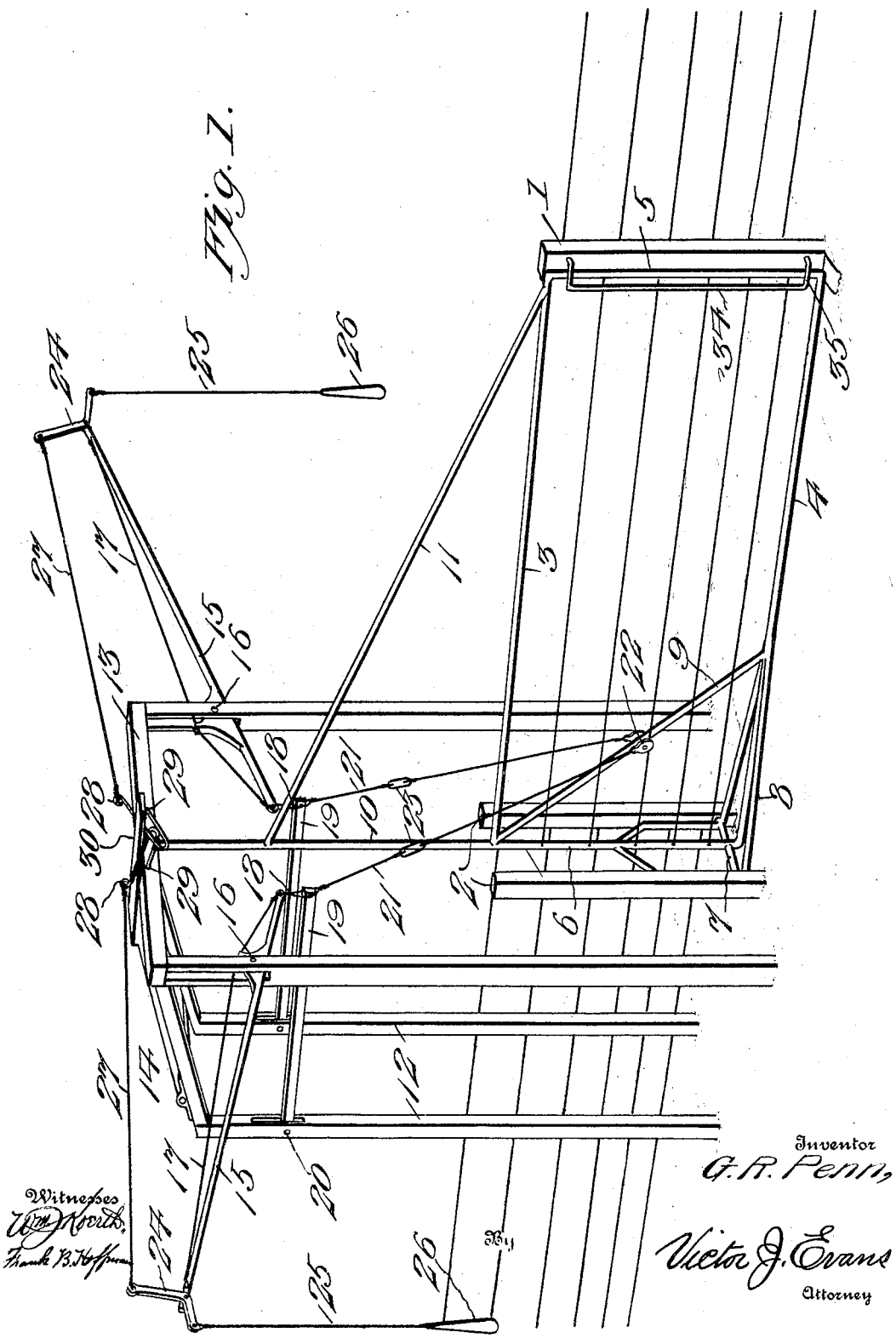

No. 770,650. Patented September 20, 1904.

UNITED STATES PATENT OFFICE.

GEORGE ROLLINS PENN, OF DALLAS, TEXAS.

GATE.

SPECIFICATION forming part of Letters Patent No. 770,650, dated September 20, 1904.

Application filed April 9, 1904. Serial No. 202,447. (No model.)

*To all whom it may concern:*

Be it known that I, GEORGE ROLLINS PENN, a citizen of the United States, residing at Dallas, in the county of Dallas and State of Texas, have invented new and useful Improvements in Gates, of which the following is a specification.

This invention relates to stock or farm gates, the object of the invention being to provide a tilting gate and operating mechanism so connected therewith and related thereto that the gate may be opened from either side by a person on horseback or in a vehicle without the necessity of dismounting, a single movement on the part of the operator serving to both unlatch the gate and swing the same to a closed or open position. The latch mechanism is arranged at such a point that the stock cannot interfere therewith, thus making it impossible for the stock to unlatch the gate. The gate is also so mounted and associated with the operating mechanism that it may be thrown open and closed without violent jarring or jerking, thus adding to the smoothness of operation and durability of all parts of the gate and operating mechanism.

With the above and other objects in view, the nature of which will more fully appear as the description proceeds, the invention consists in the novel construction, combination, and arrangement of parts, as herein fully described, illustrated, and claimed.

In the accompanying drawings, Figure 1 is a perspective view of a gate and the operating mechanism therefor, the same being constructed in accordance with the present invention. Fig. 2 is a view in elevation of the same, showing a portion of the frame in section to better illustrate the construction and operation of the latch.

Like reference-numerals designate corresponding parts in both figures of the drawings.

Referring to the drawings, 1 designates the latch-post of the gate, and 2 a pair of posts located adjacent to the hinge-stile of the gate, but at opposite sides thereof, the gate working between the oppositely-arranged posts 2.

The gate comprises the upper and lower rails 3 and 4, respectively, the latch-stile 5, and the hinge-stile 6. In its general shape the gate proper is rectangular and may be made of any suitable size and constructed of wood or metal and either in solid form or in the form of tubing.

The hinge or pivot of the gate consists of a rod or bolt 7, located near the inner lower corner of the gate and extending transversely in opposite directions from the stile or upright 6, as clearly shown in Fig. 1, the ends of the rod 7 being journaled in suitable bearings formed in the lower portions of the posts 2 near the ground, thus adapting the gate as a whole to tilt upward or downward and occupy either a horizontal or vertical position. Lateral or diagonal braces 8 are interposed between the bottom rail 4 and the bolt or pivot 7, as shown best in Fig. 1, while a longitudinal and diagonal brace 9 is interposed between the bottom rail 4 and the upper inner corner of the gate proper. The stile or upright 6 is extended a considerable distance above the gate to form an upwardly-projecting standard 10, between which and the outer upper corner of the gate is interposed an oblique suspension brace or truss 11.

Adjacent to the posts 2 there is arranged a framework consisting of a series of uprights 12, connected at the top by suitable crossbars 13 and 14 to form a substantial framework for supporting the gate-operating mechanism. The said mechanism comprises a pair of oppositely-extending levers 15, fulcrumed intermediate their ends at 16 on the posts 12 and braced by means of truss-wires. The levers 15 are connected at their inner ends by means of suitable links 18 to the free ends of a pair of pivoted arms 19, the same being connected pivotally at 20 to the rearmost posts 12. Extending downward from each of the pivoted arms 19 is a connection 21, which is attached, by means of a swivel or pivot plate 22, to the gate and preferably to the diagonal brace 9 about midway the height of the gate. Each of the connections 21 is by preference provided with a take-up device in the form of a turnbuckle 23, so as to adjust the position of the gate-operating levers 15. The arms 19 take the angular strain of the connections 21 and prevent said connections from exerting any angular or twisting strain on the operating-levers 15, thus making the operation of the levers 15 smooth and reliable.

Pivotally connected to the outer extremity of each of the levers 15 is a bell-crank latch-operating lever 24, one arm of which is provided with a pull-rope 25, having a terminal handle or grip 26, while the other arm has attached thereto a connection 27, which extends inward and is connected at its opposite end to a latch-tripping lever 28, pivotally connected at 29 to the upper frame-bar 13, as shown in Fig. 1. The two levers 28 operate beneath the forwardly-projecting portion 30 of a latch 31, which is pivotally mounted at its opposite end, as shown at 32. The forward portion 30 of the latch extends over the cross-bar 13, the latter serving to limit the downward movement of the latch. The latch is provided with a square shoulder 33, which extends downward below the upper frame-bar 13 and engages the upper extremity of the standard 10, as clearly shown in Fig. 2, in which figure the gate is shown as locked in its closed position. When either one of the latch-tripping levers 28 is rocked, it lifts the forward end of the latch and moves the shoulder 33 out of the path of the standard 10. At the same time the operating-lever 15 through the medium of the connection 21 lifts the gate, and in the further movement of the lever 15 the gate is thrown open. While the gate is in a vertical position it remains in its open position, there being no tendency for the gate to fall. However, by pulling on one of the handles 26 the same effect is produced on the gate as in opening the same, and the gate is therefore tilted toward its closed position until the weight thereof acts to complete the operation.

Secured to the latch-post 1 is a keeper 34 in the form of a vertically-extending rod with end portions bent transversely, as shown at 35, and secured to one side of the latch-post 1, the latch-stile of the gate being received between the post 1 and the keeper 24, as illustrated in Figs 1 and 2.

While the latch-tripping levers 28 are shown as formed of bent rods, it will be obvious that said levers may be made in other ways so long as they can be operated by the connections 27 and act as cams to raise the latch and release the gate. It will also be seen that the latch mechanism is out of the reach of the stock and cannot be interfered with. The gate swings on a single pivot with a minimum amount of friction and is well balanced, so as to work smoothly without jumping or jerking. The gate automatically latches itself as it moves to the closed position.

Having thus described the invention, what is claimed as new is—

1. A tilting gate provided with a standard extending above the same and movable therewith, in combination with a shouldered latch for engaging the upper end of said standard, and an operating-lever connected with the latch and gate in such manner as to simultaneously unlatch and tilt the same.

2. A tilting gate provided with a fixed standard extending above the same in combination with a shouldered gravity-latch for engaging said standard the shoulder of the latch fitting over the upper end of the standard when the gate is closed, an operating-lever for tilting the gate, and connections between said lever and the latch for tripping the latter prior to the tilting of the gate.

3. A tilting gate comprising a standard extending upward above the same and rigidly connected therewith, a frame adjacent to the gate, a shouldered latch mounted on said frame and adapted to engage the upper end of the standard, a latch-tripping lever mounted on said frame, a gate-tilting lever and connections between the gate-tilting lever and the latch-tripping lever, substantially as and for the purpose specified.

4. A tilting gate provided with a rigidly-attached standard extending upward above the same and gate-operating mechanism comprising a supporting-frame, oppositely-extending operating-levers connected with the gate for tilting the latter, a shouldered latch for engaging said standard and holding the gate closed, latch-tripping levers mounted on said frame, and connections between said latch-tripping levers and the operating-levers whereby the gate is simultaneously unlatched and tilted, substantially as described.

5. A tilting gate provided with a rigidly-attached standard extending upward above the same in combination with gate-operating mechanism embodying a supporting-frame, a gate-operating lever fulcrumed on said frame and connected with the gate, a pivoted arm the free end of which is connected with the operating-lever and the gate, a latch for engaging and moving over the upper end of the standard, and latch-operating devices connected with the gate-operating lever for simultaneous operation, substantially as described.

6. A tilting gate provided with a standard extending upward above the same and rigidly connected therewith, an operating-lever connected with the gate for tilting the latter, a shouldered latch for engaging the standard the shoulder of the latch moving over and engaging the upper end of the standard when the gate is closed, a latch-tripping lever, a bell-crank latch-operating lever fulcrumed on the gate-operating lever, and operatively connected with the latch-tripping lever, and means for moving said latch-operating lever, substantially as described.

7. A tilting gate provided with a rigid standard extending upward above the same, in combination with gate-operating mechanism, embodying a frame, a shouldered latch mounted thereon for engaging the standard the shoulder of the latch moving over and engaging the upper end of the standard, the said latch being operative from its rear end, gate-operating levers extending in opposite directions from and fulcrumed on said frame, latch-operating devices connected with the gate-operating lever, pivoted arms mounted on said frame and having a linked connection with the gate-operating levers, and connections extending from the pivoted arms to the gate, all arranged for joint operation, substantially as described.

In testimony whereof I affix my signature in presence of two witnesses.

GEORGE ROLLINS PENN.

Witnesses:
B. H. WEBSTER,
A. L. WHALEY.